Jan. 11, 1966     J. W. MEYS     3,228,446

ANTI-SKID DEVICE

Filed Jan. 10, 1964     3 Sheets-Sheet 1

Joseph W. Meys,
Inventor.
Koenig, Senniger, Powers and Leavitt
Attorneys.

Jan. 11, 1966   J. W. MEYS   3,228,446
ANTI-SKID DEVICE

Filed Jan. 10, 1964   3 Sheets-Sheet 3

United States Patent Office 3,228,446
Patented Jan. 11, 1966

3,228,446
ANTI-SKID DEVICE
Joseph W. Meys, St. Louis, Mo., assignor to Meys Enterprises, Inc., St. Louis, Mo., a corporation of Missouri
Filed Jan. 10, 1964, Ser. No. 336,916
4 Claims. (Cl. 152—241)

This invention relates to an anti-skid device for vehicle tires and more particularly to an anti-skid chain device adapted for use with a vehicle tire.

The installation and removal of many conventional anti-skid chains from tires are usually cumbersome and involve difficult procedures, often making it necessary to jack up the wheel or the car to perform these operations. During intermittent sieges of inclement weather, it may be necessary to install and remove such chains several times. Since the ordinary motorist usually has such work performed by service stations, the cost of the service work in one winter season may exceed the cost of the chains. Furthermore, the cross chains of conventional anti-skid devices are subjected to rapid wear and often break thereby rendering the complete chain useless or at least substantially decreasing the effectiveness of the complete chain. The anti-skid chain device of this invention overcomes the stated drawbacks of conventional tire chains.

Accordingly, among the several objects of this invention may be noted the provision of an anti-skid device which may easily be installed on and removed from an automobile tire without the necessity for jacking up the tire or the automobile from the ground; the provision of an anti-skid device having cross chains which are detachably connected and may be readily removed and replaced when broken; the provision of such a device which is adapted to fit various sizes of the tires with equal effectiveness; and the provision of an anti-skid device which is simple and economical in construction. Other objects and features will be in part apparent and in part pointed out hereinafter.

In the accompanying drawings, in which several of various possible embodiments of the invention are illustrated, FIG. 1 is a side view in elevation of one embodiment of an anti-skid device of this invention on a wheel-mounted tire, taken from the outside of the tire, the tire being shown in phantom;

Corresponding reference characters indicate corresponding parts throughout the several views of the drawings.

Figure 1:
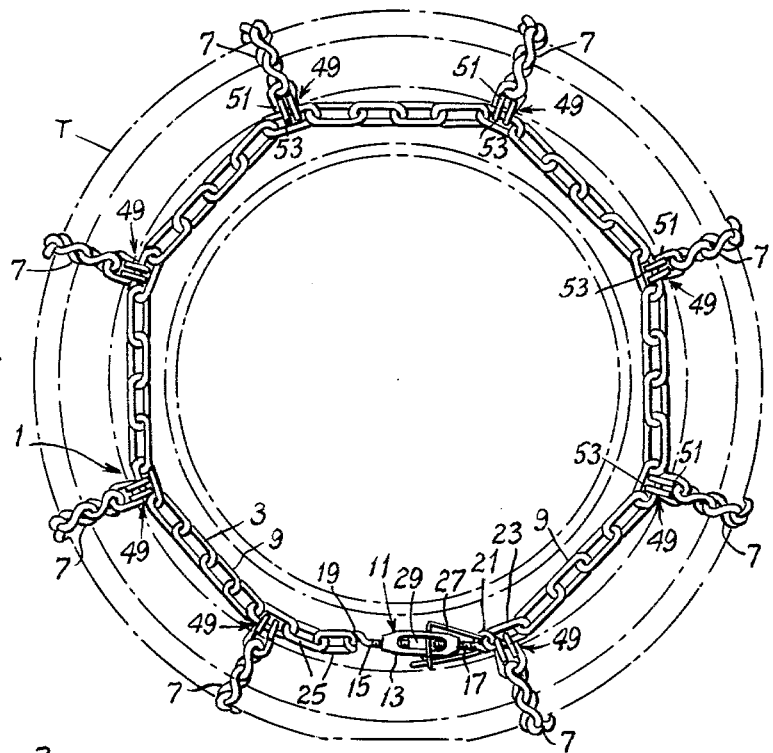

Referring now to the drawings, an anti-skid device of this invention generally designated 1 is shown attached to a wheel-mounted tire T. The anti-skid device generally comprises an outside connector assembly 3 adapted to be located on the outside of a tire, an inside connector assembly 5 adapted to be located on the inside of a tire, assemblies 3 and 5 being connected by a plurality of cross chains 7 extending across the tire.

The outside connector assembly 3 includes a length of chain 9 the ends of which are adapted to be hooked together by a turnbuckle assembly 11. Turnbuckle assembly 11 comprises a turnbuckle body 13. End members 15 and 17 are threaded into body 13 and have hooked ends or eyes 19 and 21, respectively. The eye 21 is connected to an end link 23 of chain 9 and is substantially closed to prevent removal from the link 23. Eye 19 is open to permit hooking engagement of it with one of the links 25 at the other end of chain 9. A locking pin 27, generally similar in operation to a conventional safety pin, is adapted to extend through link 23 and an opening 29 in turnbuckle body 13 for locking the body against rotation relative to link 23 and end member 17.

Figure 6:
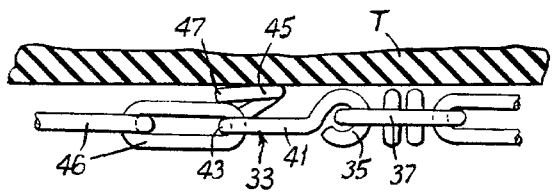
FIG. 6 is an enlarged fragmentary section taken on line 6—6 of FIG. 2.

Inside connector assembly 5 comprises a length of chain 31, the ends of which are adapted to be connected and locked together by a safety hook 33. Safety hook 33 includes an eye 35 (see FIG. 6) connected with an end link 37. A shank portion 41 extends from eye 35. At the outer end of shank portion 41 the safety hook 33 is formed into a first loop 43 opening in the direction toward the inner end of shank portion 41 and eye 35, and a second loop 45 at the end of the first loop 43 opening in the opposite direction. The loops 43 and 45 are threaded through one of the links 46 at the end of chain 31 with the outer end 47 of second loop 45 adjacent tire T (see FIG. 6). By locating end 47 adjacent the tire, link 46 is prevented from becoming detached or disengaged from safety hook 33.

Each of the cross chains 7 at its ends is provided with a connector 49 for securing the chain to links of the inside and outside connector assemblies 3 and 5. Each connector 49 comprises a steel rod, for example, bent to form a horseshoe portion 51. The ends of the horseshoe portion 51 are bent to form hooks or eyes 53 for locking engagement with a link on the connector assemblies. The ends of the eyes 53 may be sprung outwardly by a tool, such as a screwdriver for example, to permit the cross chains 7 to be connected to or removed from the connector assemblies.

Figure 3:
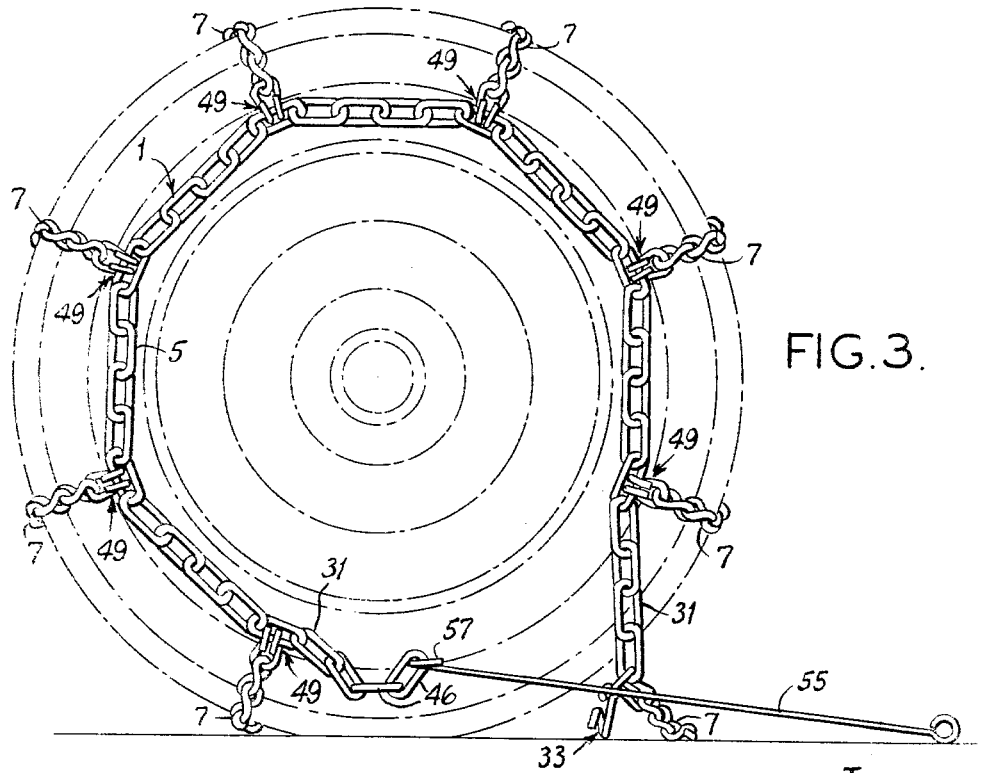
FIG. 3 is a view similar to FIG. 2, illustrating a method of connecting the anti-skid device.

An elongate wire 55 may be provided with the anti-skid device. Wire 55 has a hooked end 57 which may be utilized to engage one of the end links 46 for pulling the end of chain 31 to the right as viewed in FIG. 3 during installation of the anti-skid device.

Figure 2:
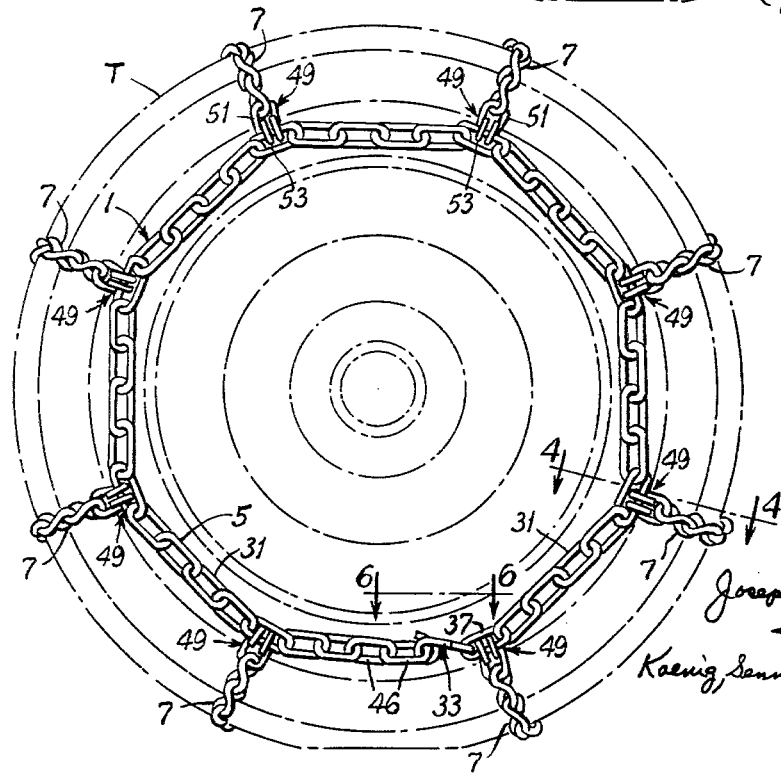
FIG. 2 is a side view in elevation from the inside of the tire.

Installation of the anti-skid device of this invention on an automobile tire, for example, may be accomplished in the following manner:

Initially, the device is disassembled, the hooked end 19 of turnbuckle end member 15 being disengaged from the chain 9, the locking pin 27 being disengaged from turnbuckle body 13 and the safety hook 33 being disengaged from the end links 46 of inside chain 31. The cross chains 7 located in the middle of the device are laid over the top of the tire so that the ends of the connector assemblies 3 and 5 drape downwardly toward the ground on the outside and inside of the tire, respectively. The hook 57 on wire 55 is then engaged with one of the end links 46 of the inside chain 31 and the wire 55 is pulled to the right as viewed in FIG. 3 to move the end of the chain 31 toward the safety hook 33. The safety hook 33 and one of the end links 46 are then interlocked. If the tire T is worn, it may be desirable to connect safety hook 33 to the link 46 adjacent the last link 46 of chain 31. The device may then be straightened on the tire to assume the general position shown in FIG. 2. Next, the hook 19 of end member 15 of the turnbuckle assembly is hooked on either the last link 25 of chain 9 or the link 25 adjacent the last link, depending on which of these links can be reached with the hooked end 19. Body 13 of turnbuckle assembly 11 is then rotated to pull the ends of chain 9 toward one another, thus tightening the anti-skid device on the tire. After the device has been tightened on the tire, locking pin 27 is clasped through the body 13 to prevent substantial rotation of the body relative to the eye 21. Without the locking pin, body 13 would tend to rotate during travel, thereby loosening the turnbuckle 11 and reducing its effectiveness, or causing the device to come apart.

As a precautionary measure, for preventing the outside assembly 3 from flying apart if one of the links of the chain 9 should break while a vehicle (to which the device is applied) is being driven, tension springs may be connected to a pair of diametrically opposed links of the outside chain 9, such as a pair of diametrically opposed links to which the connectors 49 are secured. These springs would hold the outside assembly 3 together until the broken link could be replaced. However, inasmuch as the likelihood is slight that one of the links of the chain 9 will break, since the chains do not receive much punishment, the tension springs are not considered necessary.

Figure 4:
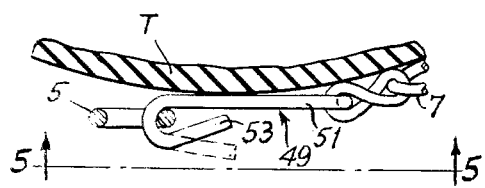
FIG. 4 is an enlarged fragmentary section taken substantially on line 4—4 of FIG. 2.
Figure 5:
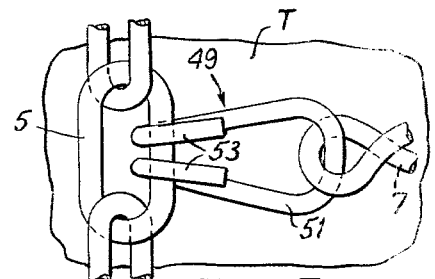
FIG. 5 is a face view of FIG. 4 taken on line 5—5 of FIG. 4.

If one of the cross chains 7 should break due to excessive wear thereon, the anti-skid device of the invention may be quickly repaired by bending the eyes 53 of the respective connectors 49 outwardly as shown in broken lines in FIG. 4, and removing the fragments of the broken cross chain. A new cross chain 7 having connectors 49 at its ends may then be connected to the outside and inside connector chains 9 and 31 by hooking the eyes 53 of the connectors 49 over the proper links of the chains 9 and 31, and bending the eyes 53 back to a closed position with pliers for example.

Figure 7:
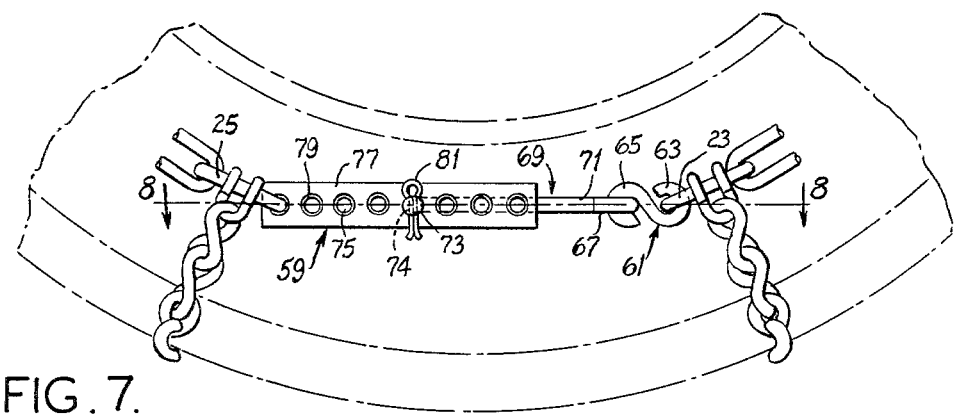
FIG. 7 is an enlarged fragmentary side elevation illustrating a second embodiment.
Figure 8:
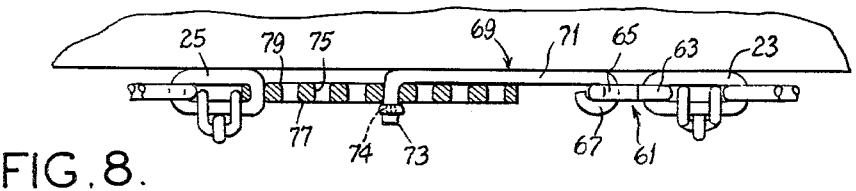
FIG. 8 is a section taken on line 8—8 of FIG. 7.

A modified embodiment for securing the ends of the chain 9 together is generally indicated at 59 in FIG. 7. It includes an S-shaped hook 61, one hooked end portion 63 of which is secured to end link 23. The other hooked end portion 65 of hook 61 is connected to an eye 67 of a generally L-shaped securing rod 69 having a shank 71 and a projecting foot 73. Foot 73 has a hole 74 through its outer end for a purpose which will be made apparent hereinafter.

End link 25 passes through one of a series of openings 75 in a generally flat securing plate 77. Each of the openings 75 is countersunk as indicated at 79.

Installation of the modified anti-skid is accomplished in the same manner as the embodiment shown in FIGS. 1-6 up to the point at which it becomes necessary to connect the ends of chain 9 together. At this juncture, the member 69 and plate 77 are grasped and manually pulled toward one another and foot 73 is slipped through one of the openings 75, depending on which opening can be reached with foot 73. A locking member, such as cotter pin 81 for example, is then inserted in hole 74 to prevent withdrawal of foot 73 from the hole 75 through which it extends.

It will thus be seen that the anti-skid device of this invention may be quickly and easily installed on a vehicle tire (without jacking up the wheel or vehicle) and also may be quickly and inexpensively repaired if one of the cross chains breaks. Another advantage of this anti-skid device is its adaptability to various sizes of tires, i.e., due to the expansible turnbuckle connection and safety hook 33 the device may be installed, for example, on 14 inch or 15 inch tires having different widths without detracting from the effectiveness of the device.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An anti-skid device for a vehicle tire comprising a first chain adapted to be positioned on one side of the tire, a second chain adapted to be positioned on the other side of the tire, a plurality of spaced cross members extending across the tire, detachable means connecting said cross members to the first and second chains, means for locking the ends of said second chain together, means for pulling the ends of the first chain toward one another to tighten said device on the tire, and means for locking said pulling means in a tightened position, said means for pulling the ends of said first chain toward one another comprises first and second securing members connected to opposite ends of said first chain, a projection extending from said first securing member having a hole through its outer end, said second securing member having a plurality of projection-receiving openings therethrough, said securing members being adapted to be grasped and pulled toward one another to tighten said device on the tire, the outer end of said projection being adapted to be slipped through one of said openings when the device is tightened on said tire, said locking means for said pulling means comprising a locking member adapted to be inserted in the hole in the outer end of said projection after the outer end of said projection has been slipped through one of said openings to prevent withdrawal of said projection.

2. An anti-skid device as set forth in claim 1 wherein said first securing member comprises a generally L-shaped rod, and said projection comprises the foot of said L-shaped rod.

3. An anti-skid device as set forth in claim 1 wherein said second securing member comprises a generally flat plate, each of said openings being countersunk to facilitate entry of said projection.

4. An anti-skid device as set forth in claim 3 wherein said first securing member comprises a generally L-shaped rod, and said projection comprises the foot of said L-shaped rod.

References Cited by the Examiner

UNITED STATES PATENTS

| | | | |
|---|---|---|---|
| 640,236 | 1/1900 | Spurgeon | 152—242 |
| 1,148,722 | 8/1915 | Smith | 152—242 |
| 1,374,348 | 4/1921 | Barrell | 152—242 |
| 1,423,202 | 7/1922 | Fellows | 152—242 |
| 2,303,804 | 12/1942 | Waid | 152—241 X |
| 2,738,821 | 3/1956 | Stremke | 152—241 |

FOREIGN PATENTS 204,673 11/1937 Switzerland.

ARTHUR L. LA POINT, *Primary Examiner.*